Patented Feb. 20, 1945.

2,369,734

UNITED STATES PATENT OFFICE 2,369,734

CATALYTIC CONVERSION PROCESS

Llewellyn Heard, Hammond, Ind., assignor to Standard Oil Company, Chicago, Ill., a corporation of Indiana No Drawing. Application February 28, 1942, Serial No. 432,791

10 Claims. (Cl. 196—52)

This invention relates to the catalytic conversion of hydrocarbon oils with an alumina gel catalyst. The invention relates more particularly to the reforming of napthas and gasoline by contacting their vapors with alumina catalysts prepared as hereinafter described.

One object of the invention is to utilize catalysts for hydrocarbon conversion having a high activity and rugged physical structure.

In accordance with the process set forth in my United States Patent 2,274,634, issued March 3, 1942, I have discovered that alumina gels made by the gelation of an laumina sol with electrolytes are particularly valuable catalysts for the conversion of hydrocarbon oils. I have now discovered that definite advantages result from the gelation of the alumina sol by the addition thereto of organic and inorganic acids of low ionization constant. Examples of such acids are formic acid, oxalic acid, maleic, tartaric and citric acids, hydrofluoric acid, sulfurous acid and phosphoric acid. Strong acids such as sulfuric, hydrochloric and nitric acids do not effect gelation but instead, produce a limpid solution of the alumina in the form of a salt.

I prefer to employ in the preparation of the catalyst alumina sol prepared from aluminum metal by amalgamation and treatment with water in the presence of a weak acid. For this purpose granular aluminum metal or foil may be amalgamated by a brief treatment with a nitric acid solution of a mercury salt, then washed with water and agitated with distilled water containing the required amount of weak acid to convert the metallic aluminum into aluminum oxide sol. The acids employed for preparing the sol may be acetic acid, formic acid, oxalic acid, etc., acids of low ionization constant being preferred. A solution of acetic acid of ½ to 2% concentration is satisfactory. Enough of the dilute acid solution may be employed to produce a syrupy alumina sol having a concentration of about 1 to 6% of aluminum oxide.

After the aluminum is substantially dissolved, the aluminum oxide sol may be decanted if desired from the undissolved metal and mercury although this step is not generally necessary. The sol is next converted to a gel by adding the acid gelation agent as described hereinabove. The amount of gelation agent required varies considerably with the particular agent used. Gelation by acid is not brought about simply as a result of adjusting the hydrogen ion concentration although the hydrogen ion concentration is an important factor. The amount of gelation agent required also varies with the concentration of the alumina sol. In general, the amount of gelation agent required is of the order of ½ to 5%. Typical gelation agents with their ionization constants are as follows:

| Gelation agent | Ionization constant |
|---|---|
| Oxalic acid | $3.8 \times 10^{-2}$ |
| Formic acid | $2.14 \times 10^{-4}$ |
| Boric acid | $6.4 \times 10^{-10}$ |
| Citric acid | $8 \times 10^{-4}$ |
| Maleic acid | $1.5 \times 10^{-2}$ |
| Sulfurous acid | $1.7 \times 10^{-2}$ |
| Tartaric acid | $1.1 \times 10^{-3}$ |
| Phosphoric acid | $1.1 \times 10^{-2}$ |

When employing phosphoric acid as the gelation agent it is preferred to neutralize the first hydrogen ion of the acid by the addition of ammonia and employ the dibasic salt rather than the tribasic acid whose action is more difficult to control. When employing sulfurous acid it is convenient to pass $SO_2$ gas directly into the alumina sol until the syrup has thickened to the point at which gelation will occur. It is characteristic that no odor of $SO_2$ is detectable in the gel, a phenomenon which may be ascribed to the adsorption of the sulfurous acid by the alumina. The yield of alumina gel may be increased by adding aluminum acetate, aluminum formate, or other aluminum salt of a weak acid to the sol at the time of gelling.

In general, I prefer to employ the volatile acids as gelation agents so that on drying and igniting the gel, the acid will be eliminated. Formic acid and oxalic acid both possess the advantage of decomposing on igniting to produce CO and $CO_2$, leaving no carbon to contaminate the catalyst. When acetic acid and certain higher organic acids are present they decompose and leave a residual carbon on ignition of the alumina gel requiring a more prolonged ignition of the gel in the presence of air to burn away the deposited carbon. In this operation unless the oxidation is carefully controlled there is considerable danger of local overheating of the catalyst occurring as a result of the highly exothermic combustion of the carbon thus deposited on the catalyst in a highly combustible form. The use of formic and oxalic acids, both for preparing the sol and as gelation agents, has the advantage of entirely avoiding the deposition of carbon on the catalyst.

In the preparation of the hydrocarbon conversion catalyst I prefer to incorporate various promoter substances, particularly the oxides of metals of variable valence such as chromium, molybdenum, vanadium, titanium, cobalt, nickel, manganese, copper, and particularly the metals of group VI of the periodic system. These promoters are preferably added in the form of certain of their salts to the alumina sol before gelation or at the time of gelation, the simplest procedure being to mix the promoter salt solution with the acid gelation agent and to add them simultaneously. The ammonium salts of chromic and molybdic acids are convenient for the purpose. Chromic, molybdic or tungstic acid may also be added. The promoter metals may also be conveniently added as their nitrates, formates, oxalates, etc. The amount of promoter employed will usually be about 1 to 10% of the weight of the alumina but higher concentrations are sometimes advantageous, for example, 20 to 30%. The promoter may also be added to the alumina gel after gelation by adsorption from promoter salt solutions or by intimately mixing the alumina hydrogel with the promoter salts, oxides, hydroxides, etc.

After the addition of the gelation acid to the alumina sol, I find it convenient to transfer the syrupy solution to trays where the gel is allowed to form, generally within a period of minutes or hours. The gel without further processing is dried in a drying oven at moderate temperatures, it being unnecessary to wash the gel when care is taken to prevent any undesirable salts or other contamination gaining access to the material in preparation. The gel is then partially decomposed in a stream of inert gas at about 800 to 1000° F. until no more water vapor condenses from the exit gases, and then decomposition is completed in a controlled stream of oxygen-containing gases until all residual carbon, if any, has been removed. It may then be desirable to further activate the product by heating at about 1200° F. for about 24 to 48 hours. The catalyst is then graded to size and is ready for use.

When the alumina sol is prepared from aluminum metal as described, no contamination with alkali metal salts occurs. Alkali metals are especially harmful to the stability and life of conversion catalysts and their absence is particularly assured by this method of preparation.

The conversion of hydrocarbons is effected by contacting the hot vapors with the catalyst under the desired conditions. In reforming gasoline and napthas of low knock rating, temperatures are generally maintained at about 900 to 1050° F. and best results are obtained by operating in the presence of hydrogen; about 1 to 3 mols of hydrogen per mol of naptha are sufficient. Pressures of the order of 50 to 400 pounds per square inch are desirable for this operation. Hydrogen is formed in the process and may be recycled to the catalyst contacting step. In a typical operation a heavy naptha having a knock rating of about 35 to 55 A. S. T. M. is converted into a gasoline having a knock rating of about 75 to 95 A. S. T. M. The contacting rate is generally maintained at a point indicated by the space velocity of 0.5 to 3 volumes of liquid naptha per hour per volume of catalyst. For certain operations, particularly the isoforming of unsaturated stocks, a much higher space velocity may be employed accompanied by a lesser increase in knock rating and also a very small loss of material. Space velocities in this case may be about 5 to 20 and generally about 10 to 15 volumes of naptha per hour per volume of catalyst.

Alumina gels prepared by the acid gelation method may be mixed with active silica and thus employed as cracking catalysts. The gels made with hydrogen fluoride are particularly suitable for cracking heavy oils. The alumina hydrogel and silica hydrogel may be mixed directly or the dried and powdered alumina gel may be mixed with silica hydrogel. Such catalysts containing about 5 to 25% alumina are very effective cracking catalysts for the conversion of heavy hydrocarbon oils into gasoline. When cracking gas oil and other heavy oils, it is preferred to employ temperatures of the order of 800 to 1050° F. at space velocities of about 0.5 to 2 and atmospheric pressure or low superatmospheric pressure of the order of 10 to 50 pounds per square inch.

In all hydrocarbon conversion operations employing the alumina gel catalysts, it is necessary to regenerate the catalyst at intervals to maintain conversion activity. In operation a deposit of carbon forms on the catalyst, lowering its activity. This is periodically removed by oxidation with air or other oxygen-containing gas. After regeneration the catalyst is employed again for converting further quantities of hydrocarbons.

The acid gelled alumina catalysts are characterized by a high activity and high stability to heat, both in process and in regeneration. The activity of the catalyst appears to depend to a considerable extent on the character of the gel structure produced in the acid gelation. Indications of the improvement in gel structure are shown by the high transparency and rigidity of the alumina hydrogel which forms a solid, vibrant mass after the addition of the gelation agent. On drying this hydrogel, the catalyst is obtained in a hard, translucent form of considerable mechanical strength.

Having thus described my invention what I claim is:

1. The process of converting hydrocarbons which comprises contacting said hydrocarbons at conversion temperature with an alumina catalyst prepared from a stable acidic alumina sol by gelation of said sol by the addition thereto of an acid of low ionization constant followed by drying of the resulting alumina gel, said catalyst being promoted by a small amount of metal of variable valence.

2. The process of claim 1 wherein said gelation acid is formic acid.

3. The process of claim 1 wherein said gelation acid is boric acid.

4. The process of claim 1 wherein said gelation acid is oxalic acid.

5. The process of converting hydrocarbons which comprises contacting them at conversion temperature with an alumina catalyst prepared by treating amalgamated aluminum metal with a weak acid thereby producing a stable alumina sol substantially free from the ions of other metals, adding an acid of low ionization constant, thereby forming an alumina hydrogel by the action of said acid on said sol and drying the resulting hydrogel.

6. The process of claim 5 wherein the alumina catalyst contains as a promoter a small amount of metal of variable valence.

7. The process of converting hydrocarbon oils which comprises contacting the vapors of said oils at conversion temperature with a catalyst prepared from the treatment of amalgamated aluminum metal with a weak acid, thereby forming a stable aluminum oxide sol, gelling said sol as a firm, vibrant, transparent gel by the addition thereto of an acid of low ionization constant and thereafter drying and igniting said gel.

8. The process of claim 7 wherein a small amount of a promoter metal is incorporated in said aluminum oxide sol before gelling.

9. The process of claim 7 wherein the salt of a promoter metal is added to said sol simultaneously with the addition of said acid of low ionization constant.

10. The process of converting hydrocarbon oils which comprises contacting the vapors of said oils at conversion temperature with a catalyst prepared by gelling a stable alumina sol in dilute acid solution by the addition thereto of an acid of low ionization constant, incorporating in the resulting gel as a promoter a small amount of an oxide of a metal of group VI of the periodic system and drying and igniting the gel containing said promoter metal.

LLEWELLYN HEARD.